(12) United States Patent
Schoenberger

(10) Patent No.: US 7,008,010 B2
(45) Date of Patent: Mar. 7, 2006

(54) WIND DEFLECTOR FOR A MOTOR VEHICLE ROOF

(75) Inventor: Michael Schoenberger, Munich (DE)

(73) Assignee: Webasto AG, Stockdorf (DE)

( * ) Notice: Subject to any disclaimer, the term of this patent is extended or adjusted under 35 U.S.C. 154(b) by 39 days.

(21) Appl. No.: 10/887,317

(22) Filed: Jul. 9, 2004

(65) Prior Publication Data
US 2005/0062318 A1 Mar. 24, 2005

(30) Foreign Application Priority Data
Jul. 11, 2003 (DE) ............... 103 31 708

(51) Int. Cl.
*B60J 7/22* (2006.01)
(52) U.S. Cl. ............. 296/217
(58) Field of Classification Search ............. 296/217
See application file for complete search history.

(56) References Cited

U.S. PATENT DOCUMENTS 5,609,388 A * 3/1997 Hattass et al. ............ 296/217

FOREIGN PATENT DOCUMENTS

DE 1 001 129 3/1957
DE 1 306 644 9/1962
DE 1 189 393 3/1965

* cited by examiner

*Primary Examiner*—Dennis H. Pedder
(74) *Attorney, Agent, or Firm*—Nixon Peabody LLP; David S. Safran

(57) ABSTRACT

A motor vehicle roof is provided which includes a roof opening, a movable cover, and a wind deflector coupled to bearing points located laterally with respect to the roof opening such that, in the closed position of the cover, the wind deflector lies between the cover and the roof surface with the deflector's top edge flush with the roof surface. The wind deflector swivels around an axis running through the bearing points when the cover is being opened such that its top edge lies over the fixed roof surface and a side of the wind deflector faces the front edge of the roof opening in any plane which is perpendicular to the swiveling axis. The side of the deflector has a curvature with a radius which corresponds to the distance of the front edge of the roof opening to the swiveling axis of the wind deflector.

13 Claims, 2 Drawing Sheets

WIND DEFLECTOR FOR A MOTOR VEHICLE ROOF

BACKGROUND OF THE INVENTION

1. Field of the Invention

The present invention relates to a motor vehicle roof with a roof opening, a cover which can be moved in the lengthwise direction of the motor vehicle in order to selectively close or at least partially clear the roof opening, and a wind deflector which is coupled to bearing points which are located laterally with respect to the roof opening. Specifically, the present invention is directed to a roof wherein, in the closed position of the cover, the wind deflector lies between the cover and the front edge of the roof opening and the top edge of the wind deflector is essentially flush with the roof surface, and wherein, when the cover is being opened, the deflector is swiveled around an axis which runs through the bearing points such that its top edge lies over the fixed roof surface.

2. Description of Related Art

While in most current motor vehicle roofs with a roof opening which can be closed by a movable cover and a wind deflector which is located in the area of the front edge of the roof opening, the wind deflector is arranged such that, with the cover closed, the wind deflector is deposited underneath the front edge of the cover, in German patent application DE-AS 1 001 129 which was filed on Jun. 26, 1954, a roof of the initially named type is described in which an L-shaped wind deflector in the rest position is edgewise in the front roof frame between the cover and the front edge of the roof opening. According to one preferred embodiment, the wind deflector bears rubber seals on one side or both sides, so that the distance normally existing between the edge of the roof skin and the front edge of the sliding cover in the closed position of the roof is bridged by closing tightly. The disadvantage in the wind deflector arrangement disclosed in German patent application DE-AS 1 001 129 is that provision is made for a seal between the wind deflector and the front edge of the roof opening only in the two end positions of the wind deflector, i.e. either in the completely folded-out position or in the completely retracted position. Moreover it is disadvantageous that, in the cover closed position between the wind deflector and the front edge of the roof opening, only a rather small contact force can be applied to the seal which has been attached to the wind deflector. Thus it cannot be ensured that the edge gap between the wind deflector and the front edge of the roof opening is in fact completely closed.

Another design of a motor vehicle roof with a wind deflector located in the closed position of the cover between the cover and the front edge of the roof opening can be found in German patent application DE-AS 1 189 393 which was filed on Jul. 14, 1960 and in a supplementary application filed for this purpose on Jun. 27, 1961. In this motor vehicle roof, the wind deflector is formed by a strip which is matched to the transverse arch of the roof and on which a strip of soft elastic material is mounted. In the closed position of the cover, the wind deflector is lowered to such an extent that its top edge lies underneath a seal which is flush with the fixed roof surface and which is mounted on the front roof frame. When the cover is being closed, the front edge of the cover rests against the wind deflector and deforms it forward until the front edge of the cover comes into contact against the seal which is located on the front edge of the roof opening. While in the motor vehicle roof disclosed in German patent applications DE-AS 1 189 393 and DE-AS 1 250 749, likewise, there is no provision for sealing between the front edge of the roof opening and the wind deflector in intermediate positions of the wind deflector. Moreover, flexible wind deflectors were not able to succeed as a result of the wind guiding properties which were poorer compared to rigid wind deflectors.

SUMMARY OF THE INVENTION

One object of the present invention is to provide a motor vehicle roof in which in all wind deflector positions provision is made for satisfactory sealing between the front edge of the roof opening and the wind deflector.

This object, and other objects, are achieved by the present invention by providing a motor vehicle roof wherein the side of the wind deflector facing the front edge of the roof opening in any plane which is perpendicular to a swiveling axis of the wind deflector has a curvature with a radius which corresponds essentially to the distance of the front edge of the roof opening to the swiveling axis of the wind deflector, which distance has been measured in this plane. Differently from motor vehicle roofs with a wind guiding surface which is cut in a straight line, a gap does not form in the wind deflector of the present invention when the wind deflector is extended and retracted. In this way, disturbing wind noise can be minimized when the wind deflector is being extended. Moreover, the permanent seal between the front edge of the roof opening and the wind deflector prevents water or dirt which has collected along the angle formed between the extended wind deflector and the fixed roof surface from traveling into the front roof space when the wind deflector is being retracted. Furthermore, by the corresponding triggering of the cover and the wind deflector, the roof opening process can be configured such that the wind deflector with the cover closed is completely extended without an air gap forming due to the opening process, i.e. neither between the front edge of the roof opening and the wind deflector nor between the wind deflector and the cover.

Although basically the wind deflector could also bear a seal in order to provide for sealing between the wind deflector and the front edge of the roof opening and/or the wind deflector and the front edge of the cover, a simpler structure is formed when the front edge of the roof opening is formed by a seal. Preferably, moreover, along the front edge of the cover, there is a seal, which in the closed position of the cover, rests against the wind deflector. Here, the front end position of the cover is preferably chosen such that the cover provides for corresponding contact pressure of the seal against the wind deflector.

To raise the wind deflector, it is preferably coupled to the bearing points via spring-mounted swiveling arms. Here the swiveling arms can be made of an elastic material or the swiveling arms can each have an essentially rigid swiveling lever and a spring which pretensions the swiveling lever in the raising direction of the wind deflector. In the latter case, the wind deflector and the swiveling levers can also be made in one piece and for example can be formed by a plastic molding. In the simplest case, the wind deflector is moved against the force of the spring into its deposited position when the cover is moved forward and engages the swiveling arms. By a suitable choice of engagement between the cover and the swiveling arms, which can also take place for example via a crank path, the opening behavior of the wind deflector can be established as desired. Instead of a continuous lifting and lowering process, the raising of the wind deflector can also take place in stages, especially to raise the wind deflector over the fixed roof surface before the cover with its seal is released from the wind deflector and thus the roof opening is cleared. By spring-mounted coupling of the wind deflector it is automatically raised as soon as it is released by movement of the cover or by separate triggering.

In another embodiment of the invention, the wind deflector is made to be able to move slightly in the direction of motion of the cover. In this way different contact pressures can be applied to the seals between the front edge of the roof opening and the wind deflector and the front edge of the cover and the wind deflector in the closed position and when the cover is being opened. The arrangement is preferably made here such that, to open the roof, the cover is moved slightly to the rear so that the seals, which are located between the front edge of the roof opening and the wind deflector and the front edge of the cover and the wind deflector, can relax, but not to such an extent that these seals detach from the respective opposing surface. In this configuration of the motor vehicle roof in the closed position, high contact pressures and thus good sealing effects can be achieved. Moreover, in the opening process, the seals do not hinder the raising of the wind deflector and accordingly provide for sufficient sealing action in order to prevent formation of edge gaps which could otherwise lead to disturbing noise when the cover is being opened.

The capacity of the wind deflector to move in the direction of motion of the cover can be accomplished especially in that the bearing points in the direction of motion of the cover are made to be able to move slightly, or the bearing points are fixed stationary with respect to the fixed roof surface and the supports of the wind deflector which are coupled to the bearing points in the direction of motion of the cover are made to be able to move slightly with respect to the bearing points. An especially simple structure arises when the wind deflector is coupled to the bearing points via elongated holes which are aligned in the direction of motion of the cover.

If in a motor vehicle roof with a wind deflector which can be moved slightly in the direction of motion of the cover, along the front edge of the roof opening, there is a seal against which the wind deflector rests when the cover is being closed as the seal is being formed, then the displacement path at the bearing points is preferably chosen such that it corresponds essentially to the amount of deformation of the seal when the cover is being closed. In this case, to move the wind deflector in the direction of motion of the cover, no additional components are necessary, but this displacement is triggered by the relaxation of the seal when the cover is being opened.

One preferred embodiment of the invention is detailed below with reference to the attached drawings.

DETAILED DESCRIPTION OF THE INVENTION

Figure 1:
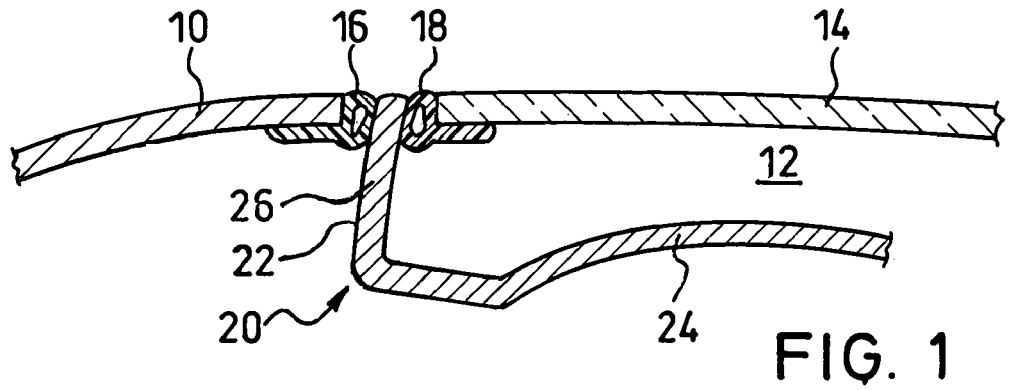
FIG. 1 shows a section through a motor vehicle roof in the area of the front edge of the roof opening.

FIG. 1 shows a section through a motor vehicle roof in the area of the front edge of a roof opening 12 which is provided in the fixed roof surface 10. The fixed roof surface 10 which is shown in FIG. 1 can be the fixed roof skin of a motor vehicle roof, a fixed glass component or also the movable cover of a multi-cover roof. To close the roof opening 12, a cover 14 is used which can be especially the movable cover of a sliding roof, a sliding and lifting roof, an externally guided sliding roof, a louvered roof or a multi-cover roof. To simplify the representation, FIG. 1 shows one embodiment in which the fixed roof surface 10 is formed by the front fixed glass component of an externally guided sliding roof, while the cover 14 is a movable glass cover. Along the edge of the fixed roof surface 10, which edge borders the roof opening 12, there is a seal 16. Along the front edge of the cover 14, there is another seal 18. In the closed position of the roof shown in FIG. 1, the wind deflector 20 is lowered to such an extent that the top edge of its wind guiding element 26, which is aligned in the transverse direction of roof, is flush with the roof surface. In the embodiment shown in the drawings, the wind guiding element 26 is pinched between the fixed roof surface 10 and the cover 14 by the displacement motion of the cover 14 in the cover closing position which is shown in FIG. 1, such that the seals 16 and 18 rest gently against the wind guiding element 26.

Figure 2:
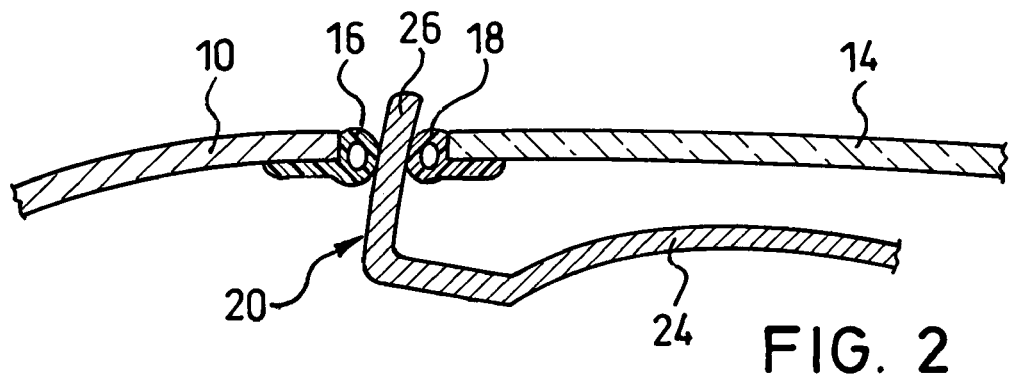
FIG. 2 shows a motor vehicle roof as shown in FIG. 1 in which the wind deflector is partially extended with the cover closed.
Figure 3:
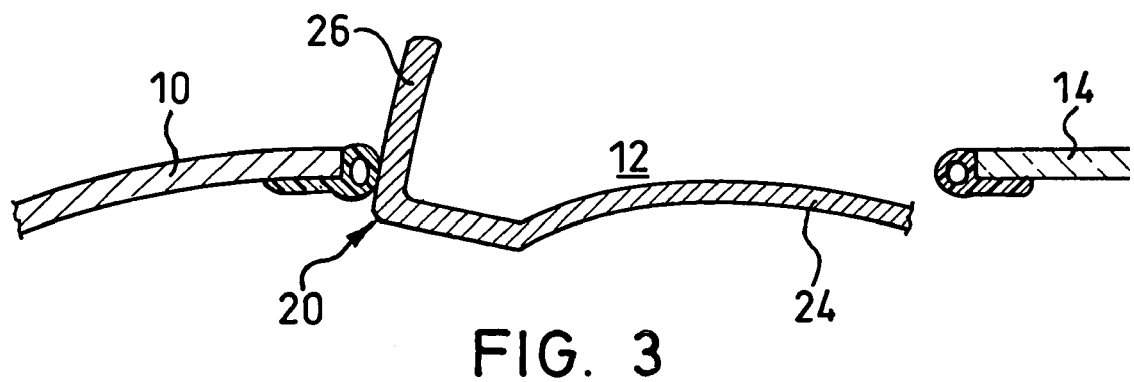
FIG. 3 shows the motor vehicle roof of the present invention with the wind deflector completely raised.

In the intermediate position shown in FIG. 2, the cover 14 is moved slightly to the rear (i.e. in the drawings to the right) so that the seals 16 and 18 as before rest against the wind guiding element 26, differently than in the closed position shown in FIG. 1, but more loosely, so that up and down motion of the wind deflector 20 is possible. In the open position shown in FIG. 3, the cover 14 is moved still farther to the rear and the wind deflector 20 is raised completely to the top. As is illustrated in FIGS. 1, 2 and 3, the side of the wind guiding element 26, which faces the front edge of the roof opening, is shaped such that it always rests against the front seal 16, regardless of the position of the wind deflector. This is accomplished in the present invention in that the side of the wind deflector 20 facing the roof opening 22, i.e. of the wind guiding element 26, has a curvature with a radius which corresponds essentially to the distance of the front edge of the roof opening to the swiveling axis of the wind deflector. To ensure that the wind deflector 20 over its entire width which is measured in the transverse direction of the motor vehicle also lies against the seal 16 on the front edge of the roof opening, when the roof opening 12 and accordingly the wind deflector 20 in the transverse direction of the motor vehicle have a curved shape, the distance of the front edge of the roof opening to the swiveling axis of the wind deflector being greatest in the middle area of the wind deflector and decreasing toward the sides of the wind deflector, the side 22 of the wind deflector 20, which faces the front edge of the roof opening in any plane which is perpendicular to the swiveling axis of the wind deflector, has a curvature with a radius which corresponds essentially to the distance of the front edge of the roof opening to the swiveling axis of the wind deflector, which distance is measured in this plane.

Figure 4:
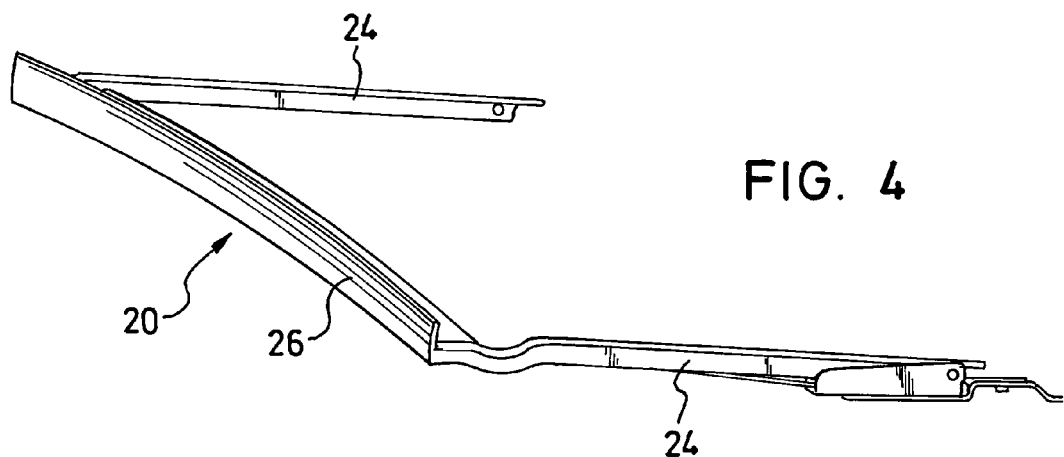
FIG. 4 shows a perspective side view of a wind deflector of the present invention.

FIG. 4 shows a perspective view of the wind deflector 20 and the elements which are used for supporting and raising the wind deflector; however for the sake of clarity the other roof elements such as for example the fixed roof surface, the movable cover and the roof frame as such not being shown. While the components used for supporting and raising the wind deflector are shown only on one of the swiveling arms of the wind deflector, the corresponding components are also provided on the other swiveling arm. In the embodiment shown in FIG. 4, the wind guiding element 26, which is aligned in the transverse direction of the motor vehicle, is made in one piece with the swiveling arms 24 which are intended for raising the wind deflector. The swiveling arms 24 are supported stationary on the roof near their back ends, for example by means of bearing journals 28 which are located in the roof frame on either side of the roof opening. As follows from FIG. 4, with the present invention, wind deflectors can be easily built for roofs in which the roof surface is highly curved in the transverse direction of the motor vehicle.

Figure 5:
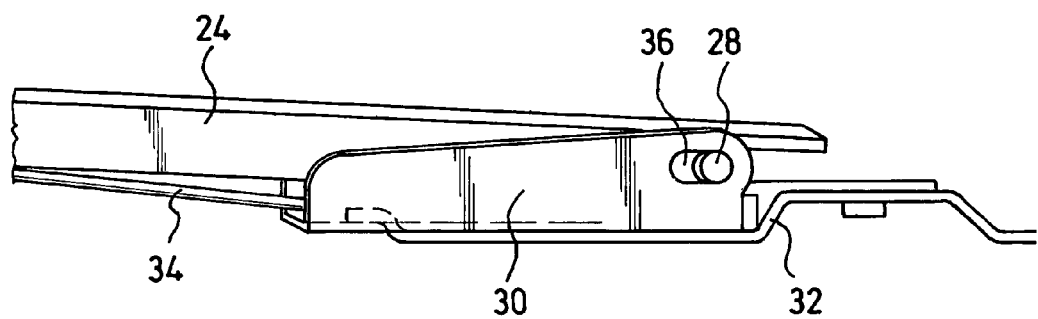
FIG. 5 shows a view of the wind deflector from FIG. 2 in the area of the bearing point.

FIG. 5 shows the back end of one of the swiveling arms 24 of the wind deflector, which end is coupled via a bearing journal 28 to a pillow block 30 fixed in the lateral roof frame 32. To raise the wind deflector 20, there is a spring 34 which pretensions the wind deflector upward. The actuation of the wind deflector takes place here via the cover 14 which, in the course of its closing motion, comes into contact with the swiveling arms 24 directly or via a crank and presses them down as the closing motion continues. When the cover is moved to the rear, the springs 34 press the wind deflector 20 up. The triggering of the wind deflector 20 can also be designed such that, as shown in FIG. 2, the wind deflector is first raised and only then is the cover 14 moved further to the rear in order to clear the roof opening 12.

In the preferred embodiment shown in FIG. 5, the roof-mounted pillow blocks 30 have elongated holes 36 in which the bearing journals 28 to which the swiveling arms 24 are coupled are guided. In this way, the wind deflector, after it has been swiveled down, i.e. retracted, can be pushed slightly forward so that the side 22 of the wind guiding element 26 facing the front edge of the roof opening is pressed against the seal 16. The wind guiding element 26 can be pressed against the seal 16 by corresponding triggering of the cover 14 in which the cover 14 is moved forward beyond the position which is shown in FIG. 5 and in which the seals 16 and 18, with little contact pressure, lie against the wind guiding element 26. In particular, for a sliding and lifting roof or an externally guided roof in which the cover at the start of the opening motion is raised with its rear edge and only then is moved to the rear, the adjustment paths can be made such that the slight motion of the front edge of the cover to the rear, which occurs when its rear edge is raised, is enough to relieve the seals 16 and 18 which were pressed against the wind deflector 20 when the cover 14 was being completely closed.

As was explained above, with the wind deflector of the present invention, it is ensured that, regardless of the position of the wind deflector, a gap is not formed between the front edge of the roof opening and the side 22 of the wind deflector which faces the front edge of the roof openings. Moreover, it is possible to build roofs in which the wind deflector is raised over the fixed roof surface before the cover is opened so that the noise which forms when the cover is being opened is minimized. Here the top edge of the wind deflector can be raised over the roof surface as soon as the cover has been moved only a short distance to the rear. Especially in roofs with a significant roof arch in the transverse direction of the motor vehicle, by the present invention in which the wind deflector is in the closed position between the cover and the front roof surface, compared to conventional roofs in which the wind deflector is deposited edgewise under the front edge of the cover, the thickness of the cover in installation space is gained. In this way, either higher wind deflectors can be used so that less wind noise altogether arises, or the thickness of the cover in head space can be gained in addition.

The invention claimed is:

1. A motor vehicle roof, comprising:
   a roof opening;
   a cover moveable in a lengthwise direction of the motor vehicle to selectively close and at least partially clear the roof opening;
   a wind deflector coupled to bearing points located laterally with respect to the roof opening, the wind deflector lying between the cover and a front edge of the roof opening and a top edge of the wind deflector flush with a fixed roof surface when the cover is in the closed position, the wind deflector being swiveled around an axis which runs through the bearing points such that the top edge of the wind deflector lies over the fixed roof surface when the cover is being opened, said wind deflector including a side facing the front edge of the roof opening in a plane which is perpendicular to the swiveling axis of the wind deflector, said side having a curvature with a radius corresponding to the distance of the front edge of the roof opening to the swiveling axis of the wind deflector, said distance being measured in the plane.

2. The motor vehicle roof of claim 1, wherein the front edge of the roof opening is formed by a seal.

3. The motor vehicle roof of claim 1, further including a seal positioned along a front edge of the cover, said seal resting against the wind deflector when the cover is in the closed position.

4. The motor vehicle roof of claim 1, wherein the wind deflector is coupled to the bearing points via spring-mounted swiveling arms.

5. The motor vehicle roof of claim 4, wherein the swiveling arms are made of an elastic material.

6. The motor vehicle roof of claim 4, wherein the swiveling arms each include a rigid swiveling lever and a spring which pretensions the swiveling lever in the raising direction of the wind deflector.

7. The motor vehicle roof of claim 6, wherein the wind deflector and the swiveling levers are made in one piece.

8. The motor vehicle roof of claim 1, wherein the wind deflector is movable in the direction of motion of the cover.

9. The motor vehicle roof of claim 8, wherein the bearing points are movable in the direction of motion of the cover.

10. The motor vehicle roof of claim 8, wherein the bearing points are fixed stationary with respect to the fixed roof surface, further including supports for the wind deflector which are coupled to the bearing points in the direction of motion of the cover, said supports being movable relative to the bearing points.

11. The motor vehicle roof of claim 10, wherein the wind deflector is coupled to the bearing points via elongated holes aligned in the direction of motion of the cover.

12. The motor vehicle roof of claim 8, further including a seal positioned along the front edge of the roof opening, said wind deflector resting against the seal when the cover is being closed.

13. The motor vehicle roof of claim 12, wherein a displacement path of the wind deflector at the bearing points corresponds to the amount of deformation of the seal when the cover is being closed.

* * * * *